(12) United States Patent
Farrahi Moghaddam et al.

(10) Patent No.: US 11,924,231 B2
(45) Date of Patent: Mar. 5, 2024

(54) MALCHAIN DETECTION

(71) Applicant: Telefonaktiebolaget LM Ericsson (publ), Stockholm (SE)

(72) Inventors: Fereydoun Farrahi Moghaddam, Brossard (CA); Makan Pourzandi, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 369 days.

(21) Appl. No.: 17/275,947

(22) PCT Filed: Sep. 11, 2019

(86) PCT No.: PCT/IB2019/057670
§ 371 (c)(1),
(2) Date: Mar. 12, 2021

(87) PCT Pub. No.: WO2020/053792
PCT Pub. Date: Mar. 19, 2020

(65) Prior Publication Data
US 2022/0038477 A1 Feb. 3, 2022

Related U.S. Application Data

(60) Provisional application No. 62/731,303, filed on Sep. 14, 2018.

(51) Int. Cl.
*H04L 29/06* (2006.01)
*G06F 21/55* (2013.01)
*G06F 21/56* (2013.01)
*H04L 9/40* (2022.01)

(52) U.S. Cl.
CPC ........ *H04L 63/1425* (2013.01); *G06F 21/552* (2013.01); *G06F 21/566* (2013.01); *H04L 63/145* (2013.01)

(58) Field of Classification Search
CPC . H04L 63/1425; H04L 63/145; G06F 21/552; G06F 21/566
See application file for complete search history.

(56) References Cited

U.S. PATENT DOCUMENTS 9,917,745 B2    3/2018  Aldrin
2016/0112245 A1*  4/2016  Mankovskii .......... H04L 41/069
                                                     709/204

(Continued)

FOREIGN PATENT DOCUMENTS

EP          3343368 A1    4/2018

OTHER PUBLICATIONS

Sheen, Shina, R. Anitha, and P. Sirisha. "Malware detection by pruning of parallel ensembles using harmony search." Pattern Recognition Letters 34.14 (2013): 1679-1686. (Year: 2013).*

(Continued)

*Primary Examiner* — Shawnchoy Rahman

(57) ABSTRACT

A method and apparatus are disclosed for malware detection in service function chains. In one embodiment, a method includes receiving data associated with a service function chain, the service function chain comprising a plurality of virtual components organized into a plurality of hierarchical levels and the data indicating interactions between the virtual components when processing at least one packet through the service function chain; filtering the received data based at least in part on a time-between order relation of the interactions between the virtual components and the hierarchical level of the virtual component; and generating a harmony feature vector for the service function chain by applying a featurization function on the filtered data, the harmony feature vector including metrics, the metrics calculated according to the featurization function for each (Continued)

hierarchical level being based at least in part on metrics calculated for at least one lower hierarchical level.

21 Claims, 4 Drawing Sheets

(56) References Cited

U.S. PATENT DOCUMENTS

| | | | |
|---|---|---|---|
| 2016/0226913 | A1 | 8/2016 | Sood et al. |
| 2017/0126792 | A1 | 5/2017 | Halpern et al. |
| 2017/0295021 | A1 | 10/2017 | Aranda Gutierrez et al. |
| 2018/0077080 | A1 | 3/2018 | Gazier et al. |
| 2018/0270113 | A1 | 9/2018 | Nainar et al. |

OTHER PUBLICATIONS

G. G. Sundarkumar, V. Ravi, I. Nwogu and V. Govindaraju, "Malware detection via API calls, topic models and machine learning," 2015 IEEE International Conference on Automation Science and Engineering (CASE), Gothenburg, Sweden, 2015, pp. 1212-1217, doi: 10.1109/CoASE.2015.7294263. (Year: 2015).*

International Search Report and Written Opinion of the International Searching Authority dated Dec. 4, 2019 issued in corresponding PCT Application Serial No. PCT/IB2019/057670, consisting of 12 pages.

DroidChain: A Novel Malware Detection Method for Android based on Behavior Chain; Zhaoguo Wang; IEEE CNS 2015 Poster Session; Downloaded on Feb. 16, 2021, consisting of 2 pages.

Machine Learning for Android Malware Detection Using Permission and API Calls; Naser Peiravian and Xingquan Zhu; 2013 IEEE 25th International Conference on Tools with Artificial Intelligence; Downloaded on Feb. 16, 2021, consisting of 6 pages.

Malware Detection with Quantitative Data Flow Graphs; Tobias Wuchner; 2014, consisting of 12 pages.

Robust and Effective Malware Detection through Quantitative Data Flow Graph Metrics; Tobias Wuchner; Feb. 12, 2015; consisting of 20 pages.

\* cited by examiner

MALCHAIN DETECTION

CROSS-REFERENCE TO RELATED APPLICATIONS

This Application is a Submission Under 35 U.S.C. § 371 for U.S. National Stage Patent Application of International Application No.: PCT/IB2019/057670, filed Sep. 11, 2019 entitled " MALCHAIN DETECTION," which claims priority to U.S. Provisional Application No.: 62/731303, filed Sep. 14, 2018, entitled "MALCHAIN DETECTION," the entireties of both of which are incorporated herein by reference.

TECHNICAL FIELD

Computer networks and in particular, malware detection for service function chains.

BACKGROUND

In the general sense, malware is software that is intended to cause harm to computers and computer systems. Malware may disable computers and computer systems or may even damage computers and computer systems. Thus, there are techniques and approaches to detecting malware.

Malware Detection Through Quantitative Data Flow Graph Metrics

For malware detection, existing techniques include engineering features based on quantitative data flow graphs (QDFG). To use QDFGs for machine learning based detection, such techniques include vectorized QDFGs with five features directly calculatable based on each QDFG. The five features include Entropy, Variance, Flow proportion, Closeness Centrality, and Betweenness Centrality where the first three are local features and the last two are global features. "Local features" may be defined for a node regarding its immediate neighbors and "global features" may be defined for a node regarding the all nodes in the QDFG.

Malware Detection with Quantitative Data Flow Graphs

Some existing techniques use data flow graphs (DFG) for malware detection. However, many existing techniques focus on finding predefined heuristics. The heuristic is basically a DFG subgraph that is associated with historical malware activity patterns such as spreading or infecting patterns.

Machine Learning for Android Malware Detection Using Permission and API Calls

Some existing techniques for Android malware detection use a combination of application programming interface (API) calls and requested permissions to detect a malware activity.

Existing solutions are defined for malware activity detection of a node among other nodes. However, these solutions may not be able to detect the malware activity in a chain of services (i.e., a service function chain) where each service may include several nodes. Thus, using these existing solutions, it is possible that each node in each service appears to be performing normal activities according to, e.g., the QDFG analysis for example. However, as a whole, the service function chain may be performing abnormally Thus, existing solutions may not be able to detect abnormal behavior for the service function chain, as a whole.

SUMMARY

Some embodiments advantageously provide a method and apparatus for detecting malware in a service function chain.

Some methods and apparatuses in this disclosure include receiving data associated with a service function chain, the service function chain comprising a plurality of virtual components organized into a plurality of hierarchical levels; filtering the received data for the plurality of virtual components of the service function chain based at least in part on which hierarchical level the virtual component belongs to; receiving information indicating a topology and a hierarchical structure of the service function chain; and computing a harmony feature vector for the service function chain by applying a featurization function on the filtered data, the topology, and the hierarchical structure of the service function chain such that metrics for each hierarchical level are based on metrics of a lower (or a different) hierarchical level.

In one aspect of the present disclosure, an apparatus for malware detection in a service function chain is provided. The apparatus includes processing circuitry. The processing circuitry is configured to receive data associated with a service function chain, the service function chain comprising a plurality of virtual components organized into a plurality of hierarchical levels and the data indicating interactions between the virtual components when processing at least one packet through the service function chain. The processing circuitry is configured to filter the received data based at least in part on a time-order relation of the interactions between the virtual components and the hierarchical level of the virtual component. The processing circuitry is configured to generate a harmony feature vector for the service function chain by applying a featurization function on the filtered data, the harmony feature vector including metrics, the metrics calculated according to the featurization function for each hierarchical level being based at least in part on metrics calculated for at least one lower hierarchical level.

In some embodiments of this aspect, the received data includes virtual system calls between the virtual components. In some embodiments of this aspect, the received data includes virtual system calls comprised in logs collected from the plurality of virtual components. In some embodiments of this aspect, the plurality of hierarchical levels includes a service function level and a service function chain level, the service function chain level being at a higher hierarchical level than the service function level. In some embodiments of this aspect, the time-order relation of the interactions between the virtual components represents a time-order relation of a set of operations performed on the at least one packet in a sequential manner from a first service function in the service function chain to a last service function in the service function chain. In some embodiments of this aspect, the processing circuitry is configured to apply the featurization function on the filtered data by being configured to for a first hierarchical level of the plurality of hierarchical levels, calculate first level metrics based on the filtered data; for a second hierarchical level of the plurality of hierarchical levels, calculate second level metrics based on the calculated first level metrics; use at least the calculated first and second level metrics to compute a first level feature vector; and use at least the calculated first level feature vector and the calculated second level metrics to compute a second level feature vector.

In some embodiments of this aspect, the processing circuitry is further configured to use the generated harmony feature vector to profile a normal behavior of the service function chain. In some embodiments of this aspect, the processing circuitry is further configured to use the generated harmony feature vector to detect malware in the service function chain. In some embodiments of this aspect, the processing circuitry is further configured to calculate an objective feature based on an objective of the service function chain. In some embodiments of this aspect, the processing circuitry is further configured to cause the apparatus to receive information indicating a topology and a hierarchical structure of the service function chain.

In another aspect of the present disclosure, a method for malware detection in a service function chain is provided. The method includes receiving data associated with a service function chain, the service function chain comprising a plurality of virtual components organized into a plurality of hierarchical levels and the data indicating interactions between the virtual components when processing at least one packet through the service function chain. The method includes filtering the received data based at least in part on a time-order relation of the interactions between the virtual components and the hierarchical level of the virtual component. The method includes generating a harmony feature vector for the service function chain by applying a featurization function on the filtered data, the harmony feature vector including metrics, the metrics calculated according to the featurization function for each hierarchical level being based at least in part on metrics calculated for at least one lower hierarchical level.

In some embodiments of this aspect, the received data includes virtual system calls between the virtual components. In some embodiments of this aspect, the received data includes virtual system calls comprised in logs collected from the plurality of virtual components. In some embodiments of this aspect, the plurality of hierarchical levels includes a service function level and a service function chain level, the service function chain level being at a higher hierarchical level than the service function level. In some embodiments of this aspect, the time-order relation of the interactions between the virtual components represents a time-order relation of a set of operations performed on the at least one packet in a sequential manner from a first service function in the service function chain to a last service function in the service function chain. In some embodiments of this aspect, the applying the featurization function on the filtered data further includes for a first hierarchical level of the plurality of hierarchical levels, calculating first level metrics based on the filtered data; for a second hierarchical level of the plurality of hierarchical levels, calculating second level metrics based on the calculated first level metrics; using at least the calculated first and second level metrics to compute a first level feature vector; and using at least the calculated first level feature vector and the calculated second level metrics to compute a second level feature vector.

In some embodiments of this aspect, the method further includes using the generated harmony feature vector to profile a normal behavior of the service function chain. In some embodiments of this aspect, the method further includes using the generated harmony feature vector to detect malware in the service function chain. In some embodiments of this aspect, the method further includes calculating an objective feature based on an objective of the service function chain. In some embodiments, the method further includes receiving information indicating a topology and a hierarchical structure of the service function chain.

In another aspect of the present disclosure, a computer readable non-transitory medium having computer program code embodied therein is provided. The computer program code is configured such that, on execution, the computer program code causes an apparatus to perform a method. The method includes receiving data associated with a service function chain, the service function chain comprising a plurality of virtual components organized into a plurality of hierarchical levels and the data indicating interactions between the virtual components when processing at least one packet through the service function chain. The method includes filtering the received data based at least in part on a time-order relation of the interactions between the virtual components and the hierarchical level of the virtual component. The method includes generating a harmony feature vector for the service function chain by applying a featurization function on the filtered data, the harmony feature vector including metrics, the metrics calculated according to the featurization function for each hierarchical level being based at least in part on metrics calculated for at least one lower hierarchical level.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
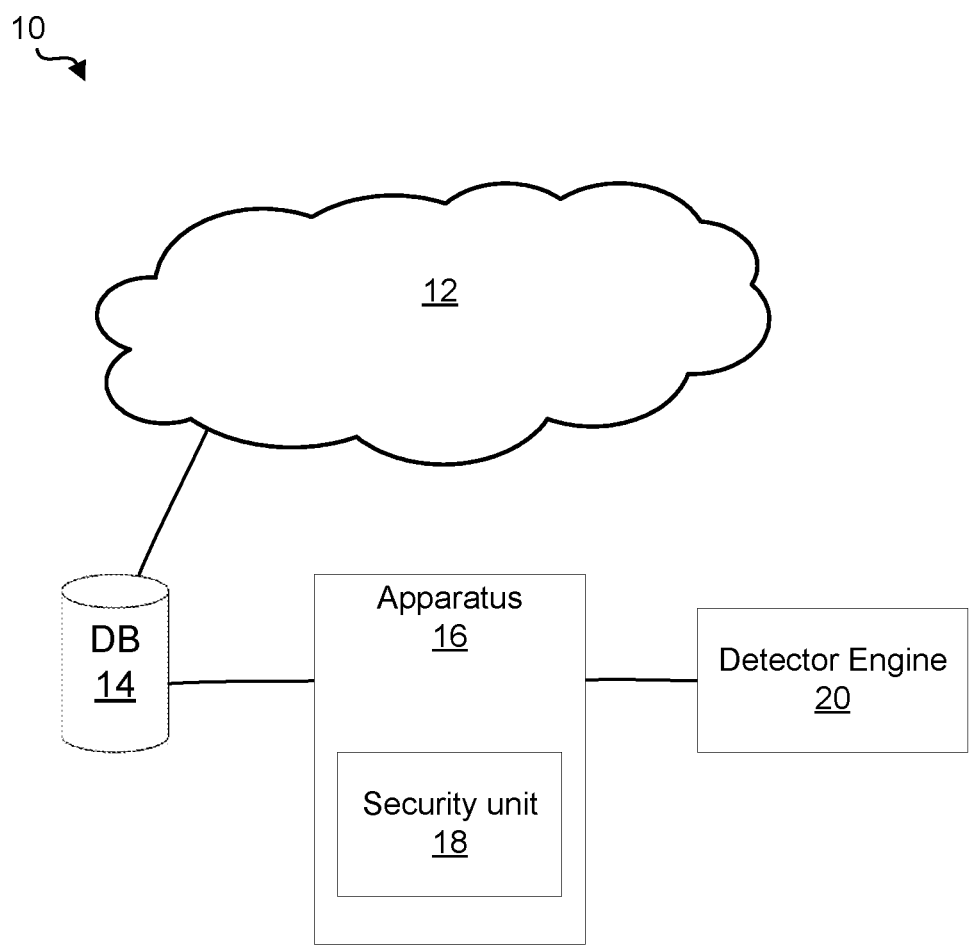
FIG. 1 is a schematic diagram of an exemplary network architecture illustrating a communication system according to the principles in the present disclosure.

Existing solutions may not be able to detect the malware activity in a chain of services where each service may include several nodes. Thus, it is possible that each node in each service appears to be performing normal activities according to e.g., the QDFG analysis for example. However, as a whole, the service function chain (also referred to herein as a service chain) may be performing abnormally.

Predefined subgraph DFG heuristics may be effective for malware activities which are known based on historical attach patterns; however, this approach may be blind to new patterns of attack.

Furthermore, using application programming interface (API) calls and user permissions for malware activity detection according to some existing techniques do not use any ordering/sequence or time feature; thus, these techniques may be blind in identifying abnormal behavior associated with a chain of services.

Existing techniques may not be effective for detecting malware in a virtual environment. For example, some existing techniques are focused on detecting malware on a single physical machine (e.g., server machine), but cannot be effectively applied to cloud computing concepts (redundancy/scaling) and/or cannot be extended to the virtual environment, particularly in a virtual environment with micro-services as these micro-services may be created or migrated frequently in a virtual environment. Furthermore, these techniques may be insufficient in detecting malware in a service chain because the techniques may not cover the distributed aspect of for example virtual system calls in a chain of virtualized network functions (VNFs) or network function virtualized (NFVs) components. In addition, existing techniques for malware detection may not consider the sequence of these virtual system calls in a distributed chain of NFVs.

For example, existing techniques using QDFG analysis may not produce a meaningful feature at a service function (SF) level because the topology is changing.

Existing techniques may not produce a meaningful feature at a chain level because of the asynchronous nature of the service chain.

Existing techniques may not be capable of capturing global malicious activities at local levels.

Thus, the principles provided in this disclosure provide a new solution based on feature engineering for a chain of service functions, where each service function may include several nodes (e.g., pods in a container-based architecture, virtual machines (VMs), etc.) for fingerprinting and identification of service function chains and mal-behavior detection of an identified or unidentified chain of service functions. The principles in this disclosure include methodologies for calculation of vectorized features for each service function based on redefined vectorized features of each node. Then, a vectorized feature may be calculated for a service function chain with a novel time-based approach based on the service functions' vectorized features. The latter service function chain feature can then be used to for example fingerprint a service function chain for identification and for detection of deviation from its healthy/normal state.

In some embodiments, the system architecture on which the principles of this disclosure may be applied is built on service function chains (also referred to as "service chains"). Each of these service function chains may include one or more service functions and each service function may include one or more (e.g., Kubernetes) micro-services. In some embodiments, the feature(s) generated according to the principles in this disclosure describe a service chain in three hierarchical layers: a chain layer, a service function layer, and a micro service layer. In this system architecture there may be no separation, isolation, or independence of the layers, meaning that for example the chain layer features are built upon the lower layers (e.g., the service function and micro-service layers). In addition, the micro-service layer features may carry some upper layer attributes (e.g., the chain and service function layer attributes). This added dependence can ensure that component malfunction and disarrangement of components can be reflected over the different layers. Therefore, the approach described in this disclosure better characterizes malfunction in a service function chain environment, as compared to traditional feature engineering where the features are independent. In the traditional feature design, it is possible that every component independently passes the service function or micro-service health check though there is an anomaly at the overall service chain level. Thus, using the principles in this disclosure, the service chain, as a whole, may in its totality be evaluated considering the interactions between different micro-services and different service functions that make up a service chain. This can be achieved by making the features at each level sensitive to other higher/lower levels without creating sensitivity to topology changes due to scaling/redundancy or overfitting.

Some embodiments of this disclosure also consider the time-space relation of service functions (or a packet handling order of the service functions) in a service function chain.

Some embodiments of this disclosure may define local features to be monitored at the micro-service level. The local features for micro-services may be complemented by global features characterizing interactions between different nodes (e.g., pods) of the micro-services and also among pods at the service function level. The pod may be for example a Kubernetes pod. The pod is a group of containers that are deployed together on the same host. Stated another way, if single containers are frequently deployed, the word "pod" can be replaced with "container" to accurately understand the concept of a pod. Further, some embodiments of this disclosure extend these global features to the service functions and the service chains in order to define new metrics to detect abnormal behavior at the service chain level. By mixing different global features at different layers, the principles in this disclosure may extend the malware detection to a function of interactions between different micro-services at the service function and the service function chain level.

In some embodiments of this disclosure, anomaly detection is based on the feature measurements in the sequence of events collected at different pods, micro-services and service functions ordered in time, as discussed in more detail below. The disclosure defines how to select the sequence of measurements in time to process a sequence of events corresponding to the handling of the same request by different pods in the service function chain. These features can be used to train a model using machine learning or can be used with a statistical approach in order to detect the malfunction or infection by malware at different layers, such as micro-service, service function or service chain layers/levels. Therefore, at least some of the principles in this disclosure provide for feature measurements representing the sequence of events in a service chain based on the order of service functions in the service function chain.

Some embodiments of this disclosure provide for malicious/malfunction NFV detection in a cloud environment that does not require internally inspecting the VNFs but rather computes features based on virtual system calls collected from logs.

Some embodiments of this disclosure provide for malicious/malfunction service chain detection that uses harmony featurization (instead of or in addition to) basic features based on metrics and patterns.

In some embodiments, the term "harmony" may be defined as the matter of coherence between different NFVs and their consisting elements to be completed (e.g., NFV chain). In some embodiments, the term "harmony" may be defined as the matter of coherence between different elements within the same NFV domain (e.g., NFV chain). In other words, the harmony of the chain may not include a consideration of elements from different NFV chains, but may include a consideration of elements from the same NFV chain. Some embodiments of this disclosure provide for graph vectorization that is useful/meaningful for detecting malware in service function chains. Some embodiments of this disclosure provide for malware detection techniques that are sensitive to malicious activity in service function chains, but may not be sensitive to load (e.g., scaling).

Some embodiments of this disclosure include defining a metric based on virtual system calls in cloud environment. Some embodiments of this disclosure include defining virtual system call metrics for redundant/scaled micro-services.

Some embodiments of this disclosure include defining virtual system call metrics for a service function built upon micro-services.

In a virtual environment, virtual components may be distributed among one or several computing nodes. Some embodiments describe collecting and/or receiving "data." To be able to collect data appropriately, data may be collected in these different, distributed computing nodes from the virtual infrastructure. In some embodiments of the present disclosure, the data being collected are and/or include virtual system calls, e.g., calls to virtual network, virtual storage and other virtual components. Thus, the logs for different virtual infrastructure components may be collected. Thus, the "data" being collected and/or received in some embodiments may be considered to be and/or include the virtual system calls, i.e., logs/data for the virtual infrastructure that the service function chain (SFC) runs on.

Some embodiments of this disclosure include measuring harmony instead of (or in addition to) measuring metrics and patterns. Some embodiments of this disclosure include defining a feature for a service function chain. Some embodiments of this disclosure include using system calls for featurization at different layers of micro-services, SFs, and chains. Some embodiments of this disclosure include use of globalized local features. Some embodiments of this disclosure include defining objective features. Such objective feature may ensure that even a fully engineered smart attack on input features are exposed by lack of delivery. In other words, some embodiments of this disclosure provide for not only measuring the harmony between pieces of a system but also, measuring the harmony between the output of a system and the system as a feature (not to be confused with performance).

This disclosure provides a new way to define the features cross different elements that are part of the same SFC chain deployed in a distributed environment. Some embodiments include defining the harmony features in pods, service functions, and service function chains. Additionally, some embodiments provide a new way to collect those features through different services and aggregate the collected features together to build a chain of virtual system calls throughout the service function chain.

Some embodiments of this disclosure provide the addition of new functionality to cloud infrastructure/virtualized environment. Some embodiments of this disclosure provide techniques for detecting malicious VNFs without considering internal hooks inside the VNF software. Some embodiments of this disclosure provide the added functionality a security manager to provide additional security for operators. Some embodiments of this disclosure provide for new functionality that can be applied to an NFV environment, without a need for access to NFVs, which may be owned or managed by different third-party vendors.

Before describing in detail exemplary embodiments, it is noted that the embodiments reside primarily in combinations of apparatus components and processing steps related to malware detection in service function chains. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "apparatus" herein can be any kind of computing device in a communication network, such as a radio communication network, which may be a software-defined network (SDN) and/or a network function virtualized network with e.g., service functions in a service function chain implemented in a cloud or container environment.

In some embodiments, the term "topology" may be used herein and may indicate and/or represent the relation between the virtual components/nodes at a hierarchical level.

Note that although terminology from one particular system, such as, for example, a system based one Kubernetes pods, may be used in this disclosure, this should not be seen as limiting the scope of the disclosure to only the aforementioned system. Other systems, including without limitation systems including virtual machines (VMs), may also benefit from exploiting the ideas covered within this disclosure.

Note further, that functions described herein as being performed by an apparatus may be distributed over a plurality of apparatuses. In other words, it is contemplated that the functions of the apparatus described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to the drawing figures, in which like elements are referred to by like reference numerals, there is shown in FIG. 1 a schematic diagram of a communication system 10, according to an embodiment, such as, for example, a 3$^{rd}$ Generation Partnership Project (3GPP)-type cellular network utilizing e.g., network function virtualization (NFV) and/or service function chaining (SFC). It is understood, however, that the arrangements described herein are not limited solely to cellular networks.

The communication system 10 comprises a cloud 12 in communication with a database 14. The communication system 10 also includes an apparatus 16 (which may include a security unit 18 discussed in more detail below) and a detector engine 20. The cloud 12 may comprise a plurality of nodes, such as Pods, VMS, or other types of virtual components. Each of the cloud 12, the database 14, the apparatus 16, and the detector engine 20 may be connectable with one another, either directly or indirectly, over one or more wired and/or wireless connections. A plurality of physical resources (e.g., compute, storage, network, etc.) may be distributed in the cloud 12 and may run, for example, micro-services, service functions, and service function chains. Note that although only one database 14, one apparatus 16, and one detector engine 20 are shown for convenience, the communication system 10 may include many more databases 14, apparatuses 16, and detector engines 20. Furthermore, the functions discussed in this disclosure for the database 14, apparatus 16, and/or detector engine 20 may be implemented on a single physical device and, in some embodiments, can be distributed among several physical devices.

An apparatus 16 is configured to include a security unit 18 which is configured to receive data associated with a service function chain, the service function chain comprising a plurality of virtual components organized into a plurality of hierarchical levels and the data indicating interactions between the virtual components when processing at least one packet through the service function chain. The security unit 18 is configured to filter the received data based at least in part on a time-order relation of the interactions between the virtual components and the hierarchical level of the virtual component. The security unit 18 is configured to generate a harmony feature vector for the service function chain by applying a featurization function on the filtered data, the harmony feature vector including metrics, the metrics calculated according to the featurization function for each hierarchical level being based at least in part on metrics calculated for at least one lower hierarchical level.

In another embodiment, the apparatus 16 is configured to includes a security unit 18 which is configured to receive data (e.g., from the database 14) associated with a service function chain, the service function chain including a plurality of virtual components organized into a plurality of hierarchical levels; filter the received data for the plurality of virtual components of the service function chain based at least in part on which hierarchical level the virtual component belongs to; receive information indicating a topology and a hierarchical structure of the service function chain; and compute a harmony feature vector for the service function chain by applying a featurization function on the filtered data, the topology, and the hierarchical structure of the service function chain such that metrics for each hierarchical level are based on metrics of a lower hierarchical level.

A detector engine 20 may be configured to receive (e.g., from apparatus 16) and use the computed harmony feature vector to, for example, detect malware in the service function chain. The detector engine 20 may include processing circuitry, a communication interface and other components to perform the detection functions. The processing circuitry may include a memory and a processor, such as those described herein with respect to the apparatus 16.

Figure 2:
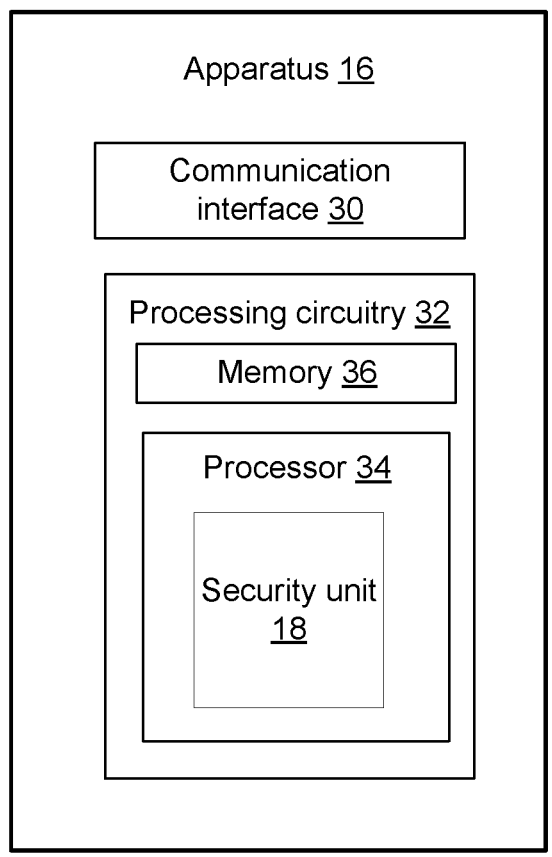
FIG. 2 is a block diagram of an apparatus including a security unit according to some embodiments of the present disclosure.

In one embodiment, as shown for example in FIG. 2, the apparatus 16 may comprise a communication interface 30 for setting up and maintaining a wired or wireless connection with an interface of a different communication device of the communication system 10. The communication interface 30 may be a wired interface and/or include a radio interface for setting up and maintaining at least a wireless connection for the apparatus 16 to communicate with other devices in the communication system 10. The radio interface may be formed as or may include, for example, one or more RF transmitters, one or more RF receivers, and/or one or more RF transceivers. In some embodiments, the communication interface 30 may not include a radio interface. In some embodiments, the apparatus 16 may be included in a security manager device or be otherwise associated with security management of for example nodes in one or more service function chains. In other embodiments, the apparatus 16 may be associated with other network management functions.

In the embodiment shown, the apparatus 16 further includes processing circuitry 32. The processing circuitry 32 may include a processor 34 and a memory 36. In particular, in addition to or instead of a processor, such as a central processing unit, and memory, the processing circuitry 32 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 34 may be configured to access (e.g., write to and/or read from) the memory 36, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the apparatus 16 may further include software or computer instructions stored internally in, for example, memory 36, or stored in external memory (e.g., database, storage array, network storage device, etc.) accessible by the apparatus 16 via an external connection. The software or computer instructions may be executable by the processing circuitry 32. The processing circuitry 32 may be configured to control any of the methods and/or processes described herein and/or to cause such methods, and/or processes to be performed, e.g., by apparatus 16. Processor 34 corresponds to one or more processors 34 for performing apparatus 16 functions described herein. The memory 36 is configured to store data, programmatic software code and/or other information described herein. In some embodiments, the software may include instructions that, when executed by the processor 34 and/or processing circuitry 32, causes the processor 34 and/or processing circuitry 32 to perform one or more of the processes described herein with respect to apparatus 16, such as for example the process described with reference to the flowchart in FIG. 3 and the other figures.

For example, the processing circuitry 32 of the apparatus 16 may include the security unit 18 configured to receive data associated with a service function chain, the service function chain comprising a plurality of virtual components organized into a plurality of hierarchical levels; filter the received data for the plurality of virtual components of the service function chain based at least in part on which hierarchical level the virtual component belongs to; receive information indicating a topology and a hierarchical structure of the service function chain; and compute a harmony feature vector for the service function chain by applying a featurization function on the filtered data, the topology, and the hierarchical structure of the service function chain such that metrics for each hierarchical level are based on metrics of a lower hierarchical level. Optionally, the processing circuitry 32 may be configured to calculate features in a lower hierarchical level based on metrics from at least one higher hierarchical level. Optionally, the processing circuitry 32 may be configured to calculate features in a medium hierarchical level (e.g., second level feature vector) and/or a higher hierarchical level (e.g., third level feature vector) based on metrics from higher hierarchical levels and features from lower hierarchical levels.

In some embodiments, the processing circuitry 32, such as via the security unit 18, is configured to apply the featurization function on the filtered data, the topology, and the hierarchical structure of the service function chain by being configured to: in a first hierarchical level of the plurality of hierarchical levels, calculate first level metrics based on the filtered data; in a second hierarchical level of the plurality of hierarchical levels, calculate second level metrics based on the calculated first level metrics; in a third hierarchical level of the plurality of hierarchical levels, calculate third level metrics based on the calculated second level metrics; use the calculated first, second and third level metrics to compute a first level feature vector; use the first level feature vector and the calculated second and third level metrics to compute a second level feature vector; and use the second level feature vector and the third level metrics to compute a third level feature vector.

In some embodiments, the processing circuitry 32, such as via the security unit 18, is further configured to use the computed harmony feature vector to profile a normal behavior of the service function chain. In some embodiments, the processing circuitry 32, such as via the security unit 18, is further configured to use the computed harmony feature vector to detect malware in the service function chain. In some embodiments, such malware detection may be performed by the detector engine 20. In some embodiments, the data includes logs collected in a predetermined time period. In some embodiments, the hierarchical levels comprise at least a micro-service level (first level, e.g. pods, containers), a service function level (second level, e.g., VNFs including one or several pods) and a service function chain level (third level, e.g., an SFC in an NFV environment can be for example a set of VNFs connected/chained in a predetermined/predefined order to process/serve network stream/traffic, where the chaining can be achieved by SDN and NSH). In some embodiments, the processing circuitry 32, such as via the security unit 18, is configured to apply the featurization function on the filtered data, the topology, and the hierarchical structure of the service function chain by being configured to apply the featurization function on a model representing virtual interactions between the virtual components and the hierarchical levels, the model generated based on the filtered data, the topology, and the hierarchical structure of the service function chain. In some embodiments, the processing circuitry 32, such as via the security unit 18, is further configured to generate the model based on virtual system calls between the virtual components, the received data including logs of the virtual system calls.

In some embodiments, the processing circuitry 32, such as via the security unit 18, is further configured to calculate features in a lower hierarchical level based on metrics from at least one higher hierarchical level. In some embodiments, the processing circuitry 32, such as via the security unit 18, is further configured to calculate features in a medium hierarchical level and/or a higher hierarchical level based on metrics from higher hierarchical levels and features from lower hierarchical levels. In some embodiments, the processing circuitry 32, such as via the security unit 18, is further configured to calculate an objective feature based on an objective of the service function chain. In some embodiments, the processing circuitry 32, such as via the security unit 18, is further configured to determine a feature sequence for the service function chain.

Although FIGS. 1 and 2 may show "units" such as security unit 18 as being within a processor, it is contemplated that these units may be implemented such that a portion of the unit is stored in a corresponding memory within the processing circuitry. In other words, the units may be implemented in hardware or in a combination of hardware and software within the processing circuitry. In some embodiments, the security unit 18 may be considered a security manager.

Figure 3:
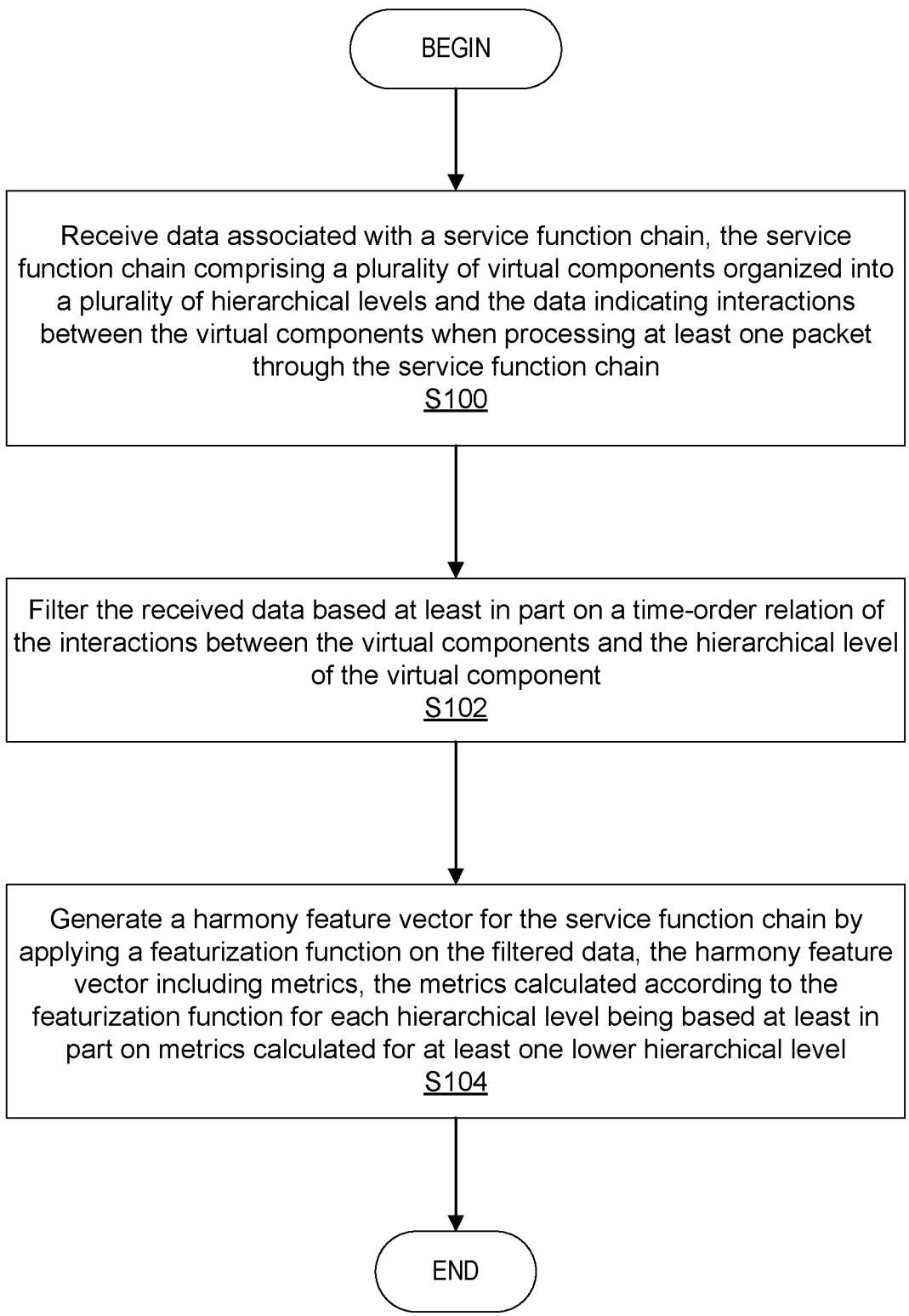
FIG. 3 is a flow chart illustrating an example method of building a harmony vector for a service function chain according to some embodiments of the present disclosure.

FIG. 3 is a flowchart of an example method implemented by an apparatus 16 for malware detection in a service function chain according to some embodiments of the present disclosure. One or more Blocks and/or functions and/or methods performed by the apparatus 16 may be performed by one or more elements of apparatus 16 such as by security unit 18 in processing circuitry 32, processor 34, communication interface 30, etc. according to the example method. The example method includes receiving (Block S100), such as via security unit 18, processing circuitry 32, processor 34 and/or communication interface 30, data associated with a service function chain, the service function chain comprising a plurality of virtual components organized into a plurality of hierarchical levels and the data indicating interactions between the virtual components when processing at least one packet through the service function chain. The method includes filtering (Block S102), such as via security unit 18, processing circuitry 32, processor 34 and/or communication interface 30, the received data based at least in part on a time-order relation of the interactions between the virtual components and the hierarchical level of the virtual component. The method includes generating (Block S104), such as via security unit 18, processing circuitry 32, processor 34 and/or communication interface 30, a harmony feature vector for the service function chain by applying a featurization function on the filtered data, the harmony feature vector including metrics, the metrics calculated according to the featurization function for each hierarchical level being based at least in part on metrics calculated for at least one lower hierarchical level.

In some embodiments, the received data includes virtual system calls between the virtual components. In some embodiments, the received data includes virtual system calls comprised in logs collected from the plurality of virtual components. In some embodiments, the plurality of hierarchical levels includes a service function level and a service function chain level, the service function chain level being at a higher hierarchical level than the service function level. In some embodiments, the time-order relation of the interactions between the virtual components represents a time-order relation of a set of operations performed on the at least one packet in a sequential manner from a first service function in the service function chain to a last service function in the service function chain.

In some embodiments, applying, such as via security unit 18, processing circuitry 32, processor 34 and/or communication interface 30, the featurization function on the filtered data further includes for a first hierarchical level of the plurality of hierarchical levels, calculating, such as via security unit 18, processing circuitry 32, processor 34 and/or communication interface 30, first level metrics based on the filtered data; for a second hierarchical level of the plurality of hierarchical levels, calculating, such as via security unit 18, processing circuitry 32, processor 34 and/or communication interface 30, second level metrics based on the calculated first level metrics; using, such as via security unit 18, processing circuitry 32, processor 34 and/or communication interface 30, at least the calculated first and second level metrics to compute a first level feature vector; and using, such as via security unit 18, processing circuitry 32, processor 34 and/or communication interface 30, at least the calculated first level feature vector and the calculated second level metrics to compute a second level feature vector.

In some embodiments, the method further includes using, such as via security unit 18, processing circuitry 32, processor 34 and/or communication interface 30, the generated harmony feature vector to profile a normal behavior of the service function chain. In some embodiments, the method further includes using, such as via security unit 18, processing circuitry 32, processor 34 and/or communication interface 30, the generated harmony feature vector to detect malware in the service function chain. In some embodiments, the method further includes calculating, such as via security unit 18, processing circuitry 32, processor 34 and/or communication interface 30, an objective feature based on an objective of the service function chain. In some embodiments, the method further includes receiving, such as via security unit 18, processing circuitry 32, processor 34 and/or communication interface 30, information indicating a topology and a hierarchical structure of the service function chain.

In another embodiments, the method includes receiving data associated with a service function chain, the service function chain comprising a plurality of virtual components organized into a plurality of hierarchical levels. The method includes filtering the received data for the plurality of virtual components of the service function chain based at least in part on which hierarchical level the virtual component belongs to. The method includes receiving information indicating a topology and a hierarchical structure of the service function chain. The method includes computing a harmony feature vector for the service function chain by applying a featurization function on the filtered data, the topology, and the hierarchical structure of the service function chain such that metrics for each hierarchical level are based on metrics of a lower hierarchical level. The method optionally includes, calculating features in a lower hierarchical level based on metrics from at least one higher hierarchical level. The method also optionally includes, calculating features in a medium hierarchical level (e.g., second level feature vector) and/or a higher hierarchical level (e.g., third level feature vector) based on metrics from higher hierarchical levels and features from lower hierarchical levels. In some embodiments, the optional step may be understood as, metrics are used for higher hierarchical levels and the feature is used for lower hierarchical levels. In other words, when computing the feature for a medium/intermediate or higher level (e.g., the second level feature), the metrics from the higher levels (e.g., third level metrics as well as the second level metrics) and the feature from the lower level (e.g., first level feature) may be used. In some embodiments, these optional steps may be part of the computation of the harmony feature vector.

In some embodiments of the example method, the applying the featurization function on the filtered data, the topology, and the hierarchical structure of the service function chain comprises: in a first hierarchical level of the plurality of hierarchical levels, calculating first level metrics based on the filtered data; in a second hierarchical level of the plurality of hierarchical levels, calculating second level metrics based on the calculated first level metrics; in a third hierarchical level of the plurality of hierarchical levels, calculating third level metrics based on the calculated second level metrics; using the calculated first, second and third level metrics to compute a first level feature vector; using the first level feature vector and the calculated second and third level metrics to compute a second level feature vector; and using the second level feature vector and the third level metrics to compute a third level feature vector.

In some embodiments, the method further includes using the computed harmony feature vector to profile a normal behavior of the service function chain. In some embodiments, the method further includes using the computed harmony feature vector to detect malware in the service function chain. In some embodiments, the data includes logs collected in a predetermined time period. In some embodiments, the hierarchical levels comprise at least a micro-service level, a service function level and a service function chain level. In some embodiments, the applying the featurization function on the filtered data, the topology, and the hierarchical structure of the service function chain comprises applying the featurization function on a model representing virtual interactions between the virtual components and the hierarchical levels, the model generated based on the filtered data, the topology, and the hierarchical structure of the service function chain. In some embodiments, the method further includes generating the model based on virtual system calls between the virtual components, the received data including logs of the virtual system calls.

In some embodiments, the method further includes calculating features in a lower hierarchical level based on metrics from at least one higher hierarchical level. In some embodiments, the method further includes, such as via the security unit 18, calculating features in a medium hierarchical level and/or a higher hierarchical level based on metrics from higher hierarchical levels and features from lower hierarchical levels. In some embodiments, the method further includes, such as via the security unit 18, calculating an objective feature based on an objective of the service function chain. In some embodiments, the method further includes, such as via the security unit 18, determining a feature sequence for the service function chain.

Figure 4:
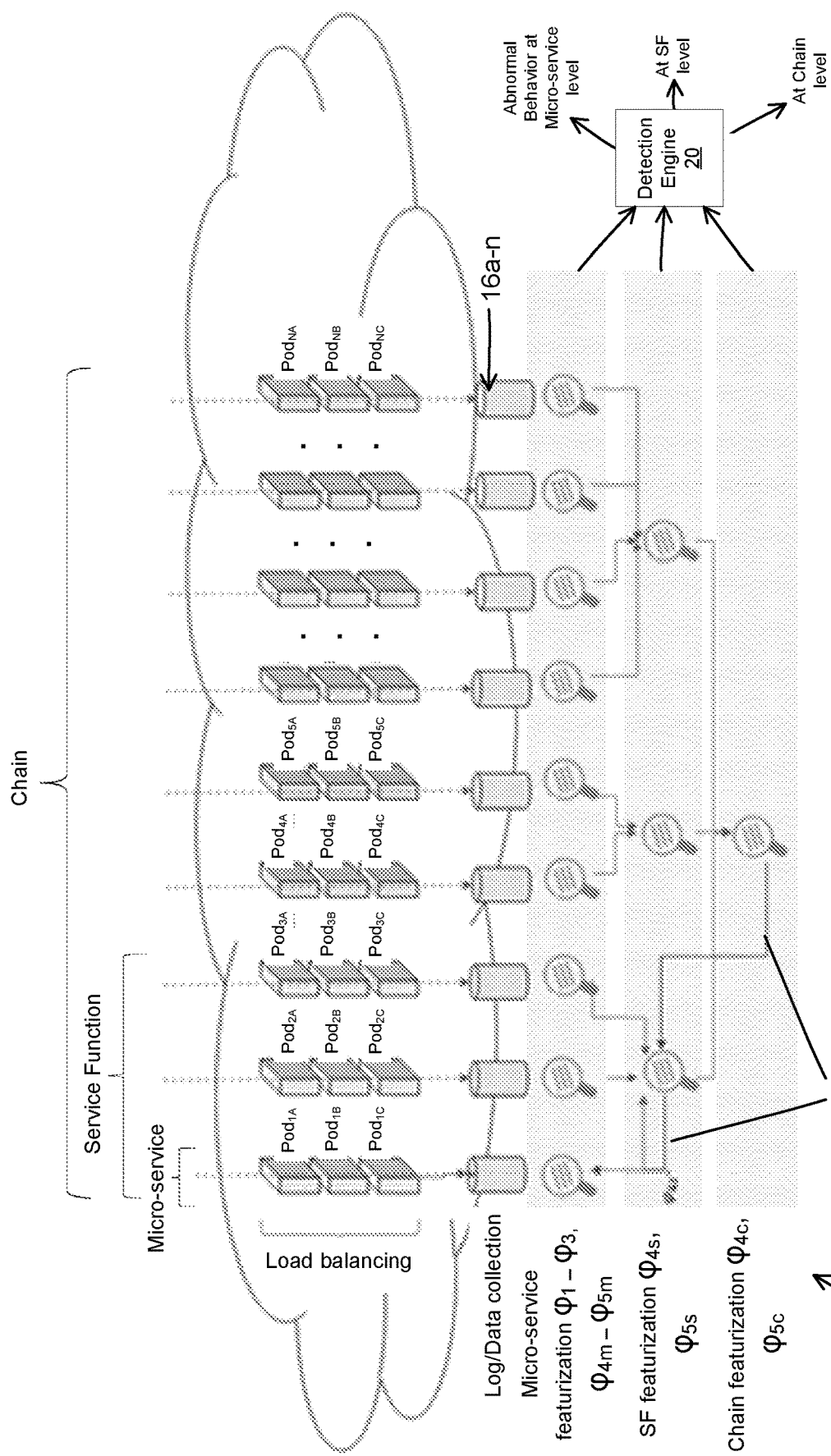
FIG. 4 is a schematic diagram of yet another exemplary network architecture illustrating a plurality of nodes organized into a hierarchical structure in a cloud environment and from which data can be collected and used to detect malware in a service function chain, according to some embodiments of the present disclosure.

Having generally described some embodiments for malware detection in a service function chain according to some of the principles of this disclosure, a more detailed description of at least some of the embodiments are provided below with example implementations and with reference to FIG. 4. FIG. 4 depicts an example hierarchical structure of a plurality of nodes/pods associated with a service function chain, according to the principles in this disclosure.

Service Function Enriched Quantitative Data Flow Graph (EQDFG)

In one example architecture, in a Kubernetes environment, a Service Function includes several sets of redundant Pods. Each set of redundant Pods is a Kubernetes service or a micro-service. Examples of micro-services are frontend and backends for a Service Function. Then, the Service Functions can be chained together such as via a Network Service Header (NSH) protocol. The micro-services within a Service Function may communicate through kube-proxy for example. However, there are other protocols for communication between redundant Pods (e.g. Pod-to-pod communication, or communication though a highly available distributed key-value store).

In one embodiment, a graph may be built using event logs. The event logs may be created or collected within one or more predefined periods of time. Based on the event logs, the apparatus 16 can build for example a QDFG according to known techniques. The nodes in the example architecture (see FIG. 4 for example) are represented by Pods, which may utilize one or more types of Pod-to-Pod and Pod-to-non-Pod communications representing the data flow/edges in the QDFG.

One example of communication between Pods is read/write from shared storage. Shared storage could be a file on a network drive, a highly available distributed key-value store or a RESTful database.

In some embodiments, the apparatus 16 may enrich the QDFGs with additional information such as the average processing time for requests in each Pod, the amount of resource(s) consumed on average in each Pod for requests (e.g., CPU, memory). Each enriched QDFG may be referred to as an EQDFG.

In some embodiments, existing feature engineering techniques based on QDFG analysis may be extended to virtual resources. Note that in the case of a virtual environment such as a cloud or container (or virtual radio access network (RAN), etc.), it is not possible to effectively apply existing QDFG approaches because they only consider the physical resources. However, in a virtual environment, even when the virtual resource consumption can be correctly mapped to the physical resources, there is no guarantee for how this could be performed when a virtual machine or Pod migrates from a physical resource to another physical resource, or when there is some cloud specific operation like scaling in and out. Therefore, the approach may be extended to the virtual resources for a more accurate representation of resource consumption in the virtual environment, as compared to existing feature engineering techniques.

Node Featurization

For node level featurization, or first level featurization, in one embodiment, five features may be used as local and global features for each node (e.g., each Pod). A goal of node level featurization may be to detect the malicious nodes (e.g., malicious Pods). However, as discussed herein above, this approach may be lacking in a service chaining environment because each individual Pod might appear to be acting non-maliciously, even if higher layers, such as the service function might be behaving in a malicious manner Therefore, in one embodiment, novel features for service functions and for the events in a service function can be built e.g., by apparatus 16 for malicious activity detection.

Node Feature Enhancement

Thus, in one embodiment, features such as $\varphi_1$-$\varphi_5$ may be produced e.g., by apparatus 16, such as via security unit 18, for each node (pod). Some features, such as $\varphi_1$-$\varphi_3$ are local features, which are concerned each pod independently from other pods. These local features may be defined as entropy (e.g., computes or represents the normalized entropy of the distribution of edge feature values such as size), variance (e.g., expresses the statistical population variance of the distribution of a certain edge feature for all outgoing edges of a node), and flow proportion (e.g., captures the proportion of a certain type of outgoing data flows of a node with respect to all outgoing flows of that node). However, some features, such as $\varphi_4$-$\varphi_5$ are global features. Global features may include closeness centrality (which may represent the inverse of that node's average distance to all other nodes of the same graph), and betweenness centrality (which may represent the relative portion of all shortest paths between all possible pairs of nodes of a graph that pass through that specific node n). These global features if used as is would measure the features among all the pods without considering the semantic relationship between different pods. For example, pods representing a micro service MS1 may not be connected in the same way between themselves, as they are connected to pods in the micro-services before and after in the SFC (or perhaps there is an absence of a relationship between pods in MS1 and the pods in a more distant micro-service in SFC).

Thus, some principles provided in this disclosure include defining special regional features that capture this semantic relationship between pods in different micro-services. Such regional features may be more suited for a service chaining environment that includes intra micro-service, inter-micro-service, and global SFC. For example, features $\varphi_{4_m}$ and $\varphi_{5_m}$ may be defined for the domain of a micro-service, features $\varphi_{4_s}$ and $\varphi_{5_s}$ may be defined for the domain of a service function, and features $\varphi_{4_c}$ and $\varphi_{5_c}$ may be defined for the total domain of a service function chain.

As for shared storage nodes, the local features may be computed, e.g., by processing circuitry 32, as indicated above. However, shared storage nodes may connect the subgraphs of pods between different service functions together, which can affect the global features in an unpredictable way depending on the topology of the functions. Therefore, some embodiments may include separately considering the shared storage nodes multiple times when computing global features for each subgraph the shared nodes are connected to. This way it can be ensured that the shared storage nodes in all the subgraphs are considered for enhanced node featurization and also that the subgraphs are not affecting each other. Note that shared nodes may be assigned the average global feature value of all subgraphs they are connected to. For example, node A be shared between MS1 and MS2. For the closeness value, the node may be assigned two values for its closeness in MS1 (e.g., C1) and MS2 (e.g., C2); thus, the node's overall closeness value would be presented as the mean value of C1 and C2.

In one embodiment, each node may be represented with these nine features:

[$\varphi_1$,
$\varphi_2$,
$\varphi_3$,
$\varphi_{4_m}$,
$\varphi_{4_s}$,
$\varphi_{4_c}$,
$\varphi_{5_m}$,
$\varphi_{5_s}$,
$\varphi_{5_c}$].

Micro-Service (MS) Featurization

In order to engineer the proper features in the service function and service function chain level, the apparatus 16 may vectorize the node features, but not just at the node (pod) level—at the micro-service level. The micro-service may include a set of pods that are providing an identical service but with different loads. One main idea here is that all the pods in the same micro-service may have the same binary, executing similar operations for the incoming traffic and representing the same behavior. Therefore, a pod should have the same statistical values (e.g., mean and variance) as other pods in the same micro-service. Hence, the same statistical values may be used for newly created pods in the system.

Accordingly, in one embodiment, a micro-service may be represented by the mean and standard deviation of the pods in that micro-service. Other embodiments may use other statistical representations of a population instead. Each micro-service may be represented by a vector of, for example, 18 features such as by:

$$[(\varphi_{1_{mean}}, \varphi_{1_{std}}),$$
$$(\varphi_{2_{mean}}, \varphi_{2_{std}}),$$
$$(\varphi_{3_{mean}}, \varphi_{3_{std}}),$$
$$(\varphi_{4_{m_{mean}}}, \varphi_{4_{m_{std}}}),$$
$$(\varphi_{4_{s_{mean}}}, \varphi_{4_{s_{std}}}),$$
$$(\varphi_{4_{c_{mean}}}, \varphi_{4_{c_{std}}}),$$
$$(\varphi_{5_{m_{mean}}}, \varphi_{5_{m_{std}}}),$$
$$(\varphi_{5_{s_{mean}}}, \varphi_{5_{s_{std}}}),$$
$$(\varphi_{5_{c_{mean}}}, \varphi_{5_{c_{std}}})]$$

Where:

$\varphi_{1_{mean}} = \text{mean}(\varphi_{1_x})$, pod $x \in$ micro service $y$;

$\varphi_{1_{std}} = std(\varphi_{1_x})$, pod $x \in$ micro service $y$;

$$(\varphi_{4_{m_{mean}}}, \varphi_{4_{m_{std}}})$$

represent global feature for micro service;

$$(\varphi_{4_{s_{mean}}}, \varphi_{4_{s_{std}}})$$

represent global feature for service function; and $$(\varphi_{4_{c_{mean}}}, \varphi_{4_{c_{std}}})$$

represent global feature for service function chain.

In order to be able to benefit from the similarity of the pods running for the same micro-service, the same feature value can be used when dealing with several nodes (pods) representing the same service. Thus, some embodiments of this disclosure solve an issue of what feature values are to be used when new pods are created on-the-fly in the micro-service in response to, for example, additional loads on the micro-service (i.e., scaling out). The characteristics of a load balanced group of pods which are providing a specific service may closely depend on the characteristics of the load balancer.

Service Function Featurization

As discussed herein above, each service function may include several micro-services. Some embodiments in this disclosure are able to successfully represent a micro-service with 18 features. However, to successfully use these features in machine learning (ML) techniques, it may be practical to have fixed size vectors for representing the items, which is not the case when there is a service function with a variable (or dynamically changing) number of micro-services as in a virtualized system. Therefore, a methodology may be used, e.g., by apparatus 16, to combine all the micro-services features together and provide a fixed size vector representing the service function. Below, two embodiments for such methodologies are described; however, these are non-limiting embodiments used as examples.

Summary Statistics Embodiment

In the discussion above regarding micro-service featurization, all the participating pods were assumed to be of the same type. Therefore, a simple mean and standard deviation was sufficient to capture the behavior of the population in most cases. However, in service function featurization, different micro-services may be assumed to be in the service function (SF). One way for representing the entire SF is to use summary statistic techniques. For example, the mean, min, and max values may be used, or to be more accurate and capture more information, other techniques may be used, such as for example, the five-number summary technique, which is known in the art and therefore will not be discussed further. Here, for the sake of simplicity the mean, min, and max values may be used for the SF featurization. For example, in one embodiment, each SF may be represented by a vector of 54 features as follows:

$$[(\{\varphi_{1_{mean_{min}}}, \varphi_{1_{mean_{mean}}}, \varphi_{1_{mean_{max}}}\},$$
$$\{\varphi_{1_{std_{min}}}, \varphi_{1_{std_{mean}}}, \varphi_{1_{std_{max}}}\}),$$
$$(\{\varphi_{2_{mean_{min}}}, \varphi_{2_{mean_{mean}}}, \varphi_{2_{mean_{max}}}\},$$
$$\{\varphi_{2_{std_{min}}}, \varphi_{2_{std_{mean}}}, \varphi_{2_{std_{max}}}\}),$$
$$(\{\varphi_{3_{mean_{min}}}, \varphi_{3_{mean_{mean}}}, \varphi_{3_{mean_{max}}}\},$$
$$\{\varphi_{3_{std_{min}}}, \varphi_{3_{std_{mean}}}, \varphi_{3_{std_{max}}}\}),$$
$$(\{\varphi_{4_{m_{mean_{min}}}}, \varphi_{4_{m_{mean_{mean}}}}, \varphi_{4_{m_{mean_{max}}}}\},$$
$$\{\varphi_{4_{m_{std_{min}}}}, \varphi_{4_{m_{std_{mean}}}}, \varphi_{4_{m_{std_{max}}}}\}),$$
$$(\{\varphi_{4_{s_{mean_{min}}}}, \varphi_{4_{s_{mean_{mean}}}}, \varphi_{4_{s_{mean_{max}}}}\},$$
$$\{\varphi_{4_{s_{std_{min}}}}, \varphi_{4_{s_{std_{mean}}}}, \varphi_{4_{s_{std_{max}}}}\}),$$
$$(\{\varphi_{4_{c_{mean_{min}}}}, \varphi_{4_{c_{mean_{mean}}}}, \varphi_{4_{c_{mean_{max}}}}\},$$
$$\{\varphi_{4_{c_{std_{min}}}}, \varphi_{4_{c_{std_{mean}}}}, \varphi_{4_{c_{std_{max}}}}\}),$$
$$(\{\varphi_{5_{m_{mean_{min}}}}, \varphi_{5_{m_{mean_{mean}}}}, \varphi_{5_{m_{mean_{max}}}}\},$$
$$\{\varphi_{5_{m_{std_{min}}}}, \varphi_{5_{m_{std_{mean}}}}, \varphi_{5_{m_{std_{max}}}}\}),$$
$$(\{\varphi_{5_{s_{mean_{min}}}}, \varphi_{5_{s_{mean_{mean}}}}, \varphi_{5_{s_{mean_{max}}}}\},$$
$$\{\varphi_{5_{s_{std_{min}}}}, \varphi_{5_{s_{std_{mean}}}}, \varphi_{5_{s_{std_{max}}}}\}),$$
$$(\{\varphi_{5_{c_{mean_{min}}}}, \varphi_{5_{c_{mean_{mean}}}}, \varphi_{5_{c_{mean_{max}}}}\},$$
$$\{\varphi_{5_{c_{std_{min}}}}, \varphi_{5_{c_{std_{mean}}}}, \varphi_{5_{c_{std_{max}}}}\})]$$

Where:

$\varphi_{1_{mean_{min}}} = \min(\varphi_{1_{mean_y}})$, micro service $y \in$ service function $z$ $\varphi_{1_{mean_{mean}}} = \text{mean}(\varphi_{1_{mean_y}})$, micro service $y \in$ service function $z$ $\varphi_{1_{mean_{max}}} = \max(\varphi_{1_{mean_y}})$, micro service $y \in$ service function $z$ -continued $$\varphi_{1_{std_{min}}} = \min(\varphi_{1_{std_y}}),$$

micro service $y \in$ service function $z$ $$\varphi_{1_{std_{mean}}} = \mathrm{mean}(\varphi_{1_{std_y}}),$$

micro service $y \in$ service function $z$ $$\varphi_{1_{std_{max}}} = \max(\varphi_{1_{std_y}}),$$

micro service $y \in$ service function $z$.

This SF feature vector may be referred to as vector $V_s(t)$ and may represent or describe the behavior of a service function s at time t. The system may collect and store the vectors at regular predetermined time intervals. These vectors representing system snapshots may then be analyzed or studied, e.g. by apparatus 16 and/or detector engine 20, to define the normal SF behavior and/or to detect abnormal behavior.

It is noted that not all the service functions can be described with one set of features. For example, the set of features may be very different when a service function is processing in ideal mode compared to when it is processing request type A, compared to when the SF is processing request type B, compared to when the SF is processing request type B with a different type of payload. Therefore, with a historical data analysis and clustering techniques, a set of vectors may be determined for each service function when it is operating in a normal mode such as $$V_{s_{ideal}}, V_{s_{process(A,P_x)}}$$

where A represents the type of request and x represent the type of payload. Another technique for building the model is to blindly cluster without knowing what is the state of the SF. In that case, the possible states of the SF may be based on the results of unsupervised clustering techniques and, for example, may be referred to as $$V_{s_{state_1}}, V_{s_{state_2}}, \ldots$$

These states then can be used to determine the deviation from the normal operation if an ML engine is trained with them. However, if for example the security unit 18 or detector engine 20 has not detected the misbehavior at this SF level, there is still has another level of detection at the service function chain (SFC) level to detect the malicious activity.

Probability Density Embodiment

In this embodiment of SF featurization, probability density functions (PDFs) may be used for representation of micro-services and service functions. PDF techniques are known in the art and therefore will not be discussed in great detail herein. When dealing with a micro-service including several nodes where each node has its own feature vector such as $\varphi_1$-$\varphi_3$, $\varphi_{4_m}$, $\varphi_{4_s}$, $\varphi_{4_c}$, $\varphi_{5_m}$, $\varphi_{5_s}$, $\varphi_{5_c}$, a PDF function can be used for each feature such as PDF($\varphi_1$). For example, nine PDF functions may represent a micro-service. At the SF level, however, these PDF functions should be aggregated to calculate a PDF function for the whole SF, which includes several micro-services. For example, if Service Function $s_k$ includes micro-services $m_a$, $m_b$, and $m_c$, the PDF function of $s_k$ will be something like the following: PDFs$_k(\varphi_1)$=g(PDFm$_a(\varphi_1)$, PDFm$_b(\varphi_1)$, PDFm$_c(\varphi_1)$), where g is a function operator such as mean. Similar to the SF featurization description above, these density functions can represent the possible states of a service function in normal operation $$(V_{s_{state_1}}, V_{s_{state_2}}, \ldots)$$

and they can be clustered and be used for malicious activity detection at the SF level.

It is noted that, for redundant components, statistical calculations such as but not limited to "mean" and/or "standard deviation" can be used. However, for non-redundant components, descriptive statistics such as "five number summary" or the "PDF function" described above can be used.

Service Chain Featurization

Regardless of which embodiment is used for SF featurization at the SF level, one or more embodiments described in this disclosure provides for the ability to make a distinction between operation states of a service function chain (SFC) with for example $$V_{s_{state_1}}, V_{s_{state_2}}, \ldots$$

The following tame, Table 1, presents the sampling of the environment at the SF level at different time slots.

TABLE 1

| | Service Function State | | |
|---|---|---|---|
| Time | Service Function #1 | Service Function #2 | Service Function #3 |
| $t_0$ | $V_{s_{1_{state_1}}}$ | $V_{s_{2_{state_5}}}$ | $V_{s_{3_{state_6}}}$ |
| $t_1$ | $V_{s_{1_{state_8}}}$ | $V_{s_{2_{state_9}}}$ | $V_{s_{3_{state_7}}}$ |
| $t_2$ | $V_{s_{1_{state_4}}}$ | $V_{s_{2_{state_2}}}$ | $V_{s_{3_{state_1}}}$ |

However, $$V_{s_{state_1}} \rightarrow V_{s_{state_5}} \rightarrow V_{s_{state_6}}$$

at $t_0$ should not be chosen as a feature representing the SFC for example, because in an SFC the SFs do not operate on the same packet (request) at the same time. Thus, a request entering the SFC leads to a set of operations over time in a sequential manner from the first service function in the chain to the last service function in the chain (note that we do not consider the case of branching in a service chain). To take this sequentiality into account for service chain featurization, a diagonal feature selection (e.g., as shown in Table 2 below) of the samples may be a more meaningful choice in terms of representing the service function chain events.

TABLE 2

| | Service Function State | | |
|---|---|---|---|
| Time | Service Function #1 | Service Function #2 | Service Function #3 |
| $t_0$ | $V_{s_{1_{state_1}}}$ | $V_{s_{2_{state_5}}}$ | $V_{s_{3_{state_6}}}$ |
| $t_1$ | $V_{s_{1_{state_8}}}$ | $V_{s_{2_{state_9}}}$ | $V_{s_{3_{state_7}}}$ |
| $t_2$ | $V_{s_{1_{state_4}}}$ | $V_{s_{2_{state_2}}}$ | $V_{s_{3_{state_1}}}$ |

For example, $$V_{s_{state_1}} \rightarrow V_{s_{state_9}} \rightarrow V_{s_{state_1}}$$

may be used to learn the normal behavior of service chains using ML with the size of 3 (3 being the length of the example service chain). In the previous example, it was assumed that all the SFs have in average the same processing time. To consider the case when the processing time per request is not identical for all the service functions, the sampling time for each SF may be considered as being variable. Based on the sampling time for different service functions, a sampling table is shown below as Table 3:

TABLE 3

| | Service Function State | | |
|---|---|---|---|
| Time | Service Function #1 | Service Function #2 | Service Function #3 |
| $t_0$ | $V_{s_{1_{state_1}}}$ | $V_{s_{2_{state_5}}}$ | $V_{s_{3_{state_6}}}$ |
| $t_1$ | | | $V_{s_{3_{state_7}}}$ |
| $t_2$ | | $V_{s_{2_{state_9}}}$ | |
| $t_3$ | $V_{s_{1_{state_8}}}$ | | $V_{s_{3_{state_{11}}}}$ |
| $t_4$ | | $V_{s_{2_{state_{19}}}}$ | $V_{s_{3_{state_4}}}$ |
| $t_5$ | $V_{s_{1_{state_4}}}$ | | $V_{s_{3_{state_5}}}$ |
| $t_6$ | | $V_{s_{2_{state_2}}}$ | |
| $t_7$ | $V_{s_{1_{state_7}}}$ | | $V_{s_{3_{state_{16}}}}$ |

In this case, for example, the representing feature sequence would be $$V_{s_1 state_1} \rightarrow V_{s_{state_9}} \rightarrow V_{s_{state_{16}}}$$

based on the sampling of processing time in different service functions 1, 2 and 3.

In some embodiments, a data flow graph may capture the time-order/sequentiality aspect of the service function chain. In other words, when building the graph, the flow of data in the graph may indicate the order.

In other embodiments, there may be other techniques used for extraction of the features for service function chains. One possible solution based on optimization is described below.

Extracting Chain Features Based on Optimization

For service function chains, building the service chain feature, e.g., by processing circuitry 32, based on lover level features (e.g., SF features) maybe more complex than, for example, building the SF feature based on lower level micro-service features. Thus, an example method for feature mining (e.g., feature pairing, etc.) is described here to aid understanding. In this example, the following optimization problem for finding the proper sequences in the system may be used to assist with illustrating this embodiment as follows. For a given size of chain n: the sequence of $$V_{s_{i_1 state_{j_1}}} \rightarrow V_{s_{i_2 state_{j_2}}} \rightarrow \ldots \rightarrow V_{s_{i_n state_{j_n}}}$$

is a proper sequence if $$\sum_{k=1}^{n} \left\| \left( t\left(V_{s_{i_k state_{j_k}}}\right) - t\left(V_{s_{i_{k-1} state_{j_{k-1}}}}\right) \right) - proc_{avg_{s_{i_k}}} \right\| \leq \text{threashold,}$$

$$t\left(V_{s_{i_k state_{j_k}}}\right) > t\left(V_{s_{i_{k-1}} state_{j_{k-1}}}\right)$$

where $k \in [1, n]$, jk represent the state index of service ik (service ik, $s_{i_k}$, was in state jk, $state_{j_k}$, in the kth ring of the chain of size n). The objective is to minimize the time difference between the average processing time in a service function and the time difference between states of this service function and another random service function in a service function chain.

Objective Featurization

To enforce the malfunction detection of the proposed solution at different layers/levels, an additional feature may be added to the set of features discussed above. This additional feature may be calculated based on the objective (e.g., purpose and/or intended outcome) of the service function chain. For example, the objective feature could be the amount of cached data divided per number of requests in a caching scenario. The added objective feature could ensure that even a fully engineered smart attack on input features can be exposed by lack of delivery at the output.

Some embodiments of this disclosure provide one or more of the following, which may be implemented by apparatus 16 and/or detector engine 20:
1. Methodologies for service function featurization and service chain featurization that are novel and useful for service chain malware activity detection.
2. Extending existing featurization techniques based on detecting malicious behavior using system call history in single servers into detecting malicious behavior using virtual system calls used in a service function chain. The service function chain is distributed in a virtualized environment which makes the usage of previous approaches on classical system calls impossible. Further, the order of service functions may be used to select the feature measurements used for anomaly detection.
3. Extending the features into new set of specific features for different layers in an NFV environment with micro-services, service functions and service chains. Mixing the features in different layers for added complexity and higher rate of malfunction detection.

4. Taking into accounts the order of different service functions in order to collect the features for different distributed pods in a container environment. The feature measurements are mapped based on the processing time for handling of the requests in the service chain. Therefore, the ML and statistical approach in this disclosure considers or accounts for the sequence of events in a virtualized service chain.

5. Enforcing the features sets by adding an objective feature.

Example Algorithm

In the following, one example algorithm is described from the perspective of one SFC (note that the algorithm is applicable to a set of SFCs). For simplicity, a container-based environment is assumed, even though the algorithm can be applied in the same way to a cloud environment. Further, in some embodiments, each of the elements listed (cloud management, data collector, MalChain processor, detector engine) below can be implemented in a cloud manager node or apparatus, such as apparatus 16. In other embodiments, one or more of the elements may be implemented on a separate device, apparatus or node, such as for example a node or device associated with a Cloud Service Provider (CSP).

Cloud Management (a cloud manager node or apparatus may perform one or more of the following):
  Select SFC-1 to be monitored, where an SFC includes VNFs chained together using SDN. In this case, an SFC is considered to be a chain of VNFs "chained" together in a specified sequence order to achieve some functionality in the network. Different VNFs may be connected together using SDN in for example Telecom access or Transport network.
  Find all virtual components associated to SFC-1 (computing, networking, storage). Note that this algorithm considers VNFs, there only virtual resources are considered, therefore the analysis only considers virtual components.
    Virtual components can in some embodiments mean:
      In virtual computing, VMs in cloud environment or pods in a container environment may be considered; for virtual networking it could be the virtual networks and the communications between different pods happening in SDN/virtual networks; for virtual storage it could be different virtual storage files. Note that even though these virtual resources are implemented using physical resources those physical resources are not considered per se in this analysis. The emphasis in the approach of this disclosure is based on the calls to virtual resources (not physical resources). This may be used to be able to capture the virtual nature of NFV in order to implement this approach in a virtualized distributed environment such as cloud or NFV. To illustrate this, consider VMs in a cloud environment; the VMs/micro-services can be instantiated in different physical servers at different times. The VMs may even be instantiated in different physical nodes during their life cycle (e.g., migration, going to sleep and coming back, scaling in/out). The same VMs may access the same exact virtual file; however, those virtual files at different moments could correspond to different physical files or be accessed for different input/output (I/O) streams. Therefore, the approach should be built on top of virtual system calls.

Data Collector (a module/function/element in the cloud manager node or apparatus may perform one or more of the following):
  Run the SFC.
  Collect all logs (e.g., virtual files accessed by pods, communications over virtual networks between pods, etc.) for SFC-1. Mark logs by meta information indicating precisely which virtual actor performed which action on what virtual resource.
  The data collection additionally should capture the time-order relation for different service functions in the SFC. This means that the logs for different SFs in the SFC should be collected based on time but additionally on the order they occur in the SFC. For example, for a SFC-1 comprised of an order of SF1->SF2->SF3, the logs should be tagged in a way to capture the fact that events on SF1 (resp. SF2) occurred before SF2 (resp. SF3) and the study of the chains of events in SFC-1 should therefore be built around this order relation. Note that the order is not simply caught by the time. For example, the logs at time t1 on SF1 are not related to the logs on time t1+$\epsilon$ in SF2 but could be related to the logs on t1+$\alpha$. Note that other techniques for capturing the time-order may be used in some embodiments.

MalChain processor (a module or function in the cloud manager node or apparatus, such as via the security unit 18 may perform one or more of the following) (in other embodiments, the MalChain processor can be run by the SFC-1 owner or by the cloud manager as appropriate):
  The logs may be received in regular intervals or in a streaming mode and the pre-processing is performed at each iteration to detect abnormal behavior or in a continuous mode.
  All logs from CSP for SFC-1 may be received.
  The received logs may be filtered for all virtual components belonging to SFC-1: based on what component they belong to, e.g., pods, micro-services and SFs.
  Determine the actions between virtual components, e.g., a message sent from Pod1 to Pod2 using virtual network resource A, Pod10 and Pod20 reading a virtual file B, etc.
  Build the model representing virtual interactions in SFC-1: this model is based on actors such as pods, virtual resources (e.g., virtual files) and actions such as for example read/write on virtual files, communications between pods, etc. The actors and resources are represented by nodes and actions are represented as edges in for example a graph. For example, pods and virtual files and virtual ports are the nodes; each time a pod accesses a virtual resource such action is represented by an edge (the edge can be quantified by the amount of consumed resource, e.g., a size of data read/written). The communications between different Pods is represented by the edges.
    Different interactions in the model between pods in micro-services and SFs defined and marked.
  Calculate hierarchical features and compute the vectorized feature set for SFC-1
    Step a) Calculate features for each pod belonging to SFC-1 based on the techniques discussed above (e.g., based on the collected data, hierarchy, and order/topology in the SFC). Hierarchy here may represent the belonging of the pods into micro services and SFs in SFC-1.

Step b) Calculate features for each micro-service belonging to SFC-1 based on the techniques discussed above (e.g., based on the collected data, pod features calculated from step a, hierarchy and order/topology in SFC-1).

Step c) Calculate features for each SF belonging to SFC-1 based on the techniques discussed above (e.g., based on the collected data, pod features calculated from step a, micro-service features from step b, hierarchy, and order/topology in SFC-1).

Step d) Calculate features for SFC-1 based on techniques discussed above (e.g., based on the collected data, pod features calculated from step a, micro-service features from step b, SF features from step c, hierarchy and order/topology in SFC-1).

Detector engine 20 or apparatus 16 may perform one or more of the following:
Receive vectorized feature set for SFC-1 from Mal-Chain processor (e.g., security unit 18).
Use ML techniques to detect pods with abnormal behavior.

Some embodiments of the present disclosure include one or more of the following steps:
Collect raw data
Filter data (will be called transactions hereafter) aka level0 metrics
Receive system structure and specification (will be called topology hereafter)
Receive desired hierarchy (will be called hierarchy hereafter)
Apply "featurization function" on transactions, topology and hierarchy and generate "harmony feature" by:
(1) In the lowest level (level 1) of hierarchy, calculate level1 metrics based on level0 metrics
(2) In the level 2 of hierarchy, calculate level2 metrics based on level1 metrics for neighbor areas (the level 1 areas that fall under the same area in level 2)
(3) In the level 3 of hierarchy, calculate level3 metrics based on level2 metrics for neighbor areas (the level 2 areas that fall under the same area in level 3)
(4) . . . iterate
(5) In the highest level (level N) of hierarchy, calculate levelN metrics based on level{N−1} metrics for neighbor areas (the level N−1 areas that fall under the same area in level N)
(6) Use the {levelN, level3, level2, level1} metrics to build level1 features (globalized local features)
(7) Use level1 feature plus {levelN, level3, level2} metrics to build level2 features
(8) . . .
(9) Use level{i−1} feature plus {levelN, level3, level_1} metrics to build level_i features
(10)
(11) Use level_{N−1} feature plus {levelN} metrics to build levelN features
Use the "harmony feature" (levelN feature) to profile the normal (in harmony) behavior of the system
Compare the harmony feature with normal feature for detecting the "discord" (disharmony)
Use the "harmony feature" for any other use.

In addition, some embodiments of the present disclosure may include one or more of the following:

Embodiment A1. An apparatus for malware detection in a service function chain, the apparatus comprising processing circuitry configured to:
receive data associated with virtual infrastructure associated with a service function chain, the service function chain comprising a plurality of virtual components organized into a plurality of hierarchical levels;
filter the received data for the plurality of virtual components of the service function chain based at least in part on which hierarchical level the virtual component belongs to;
receive information indicating a topology and a hierarchical structure of the service function chain; and
compute a harmony feature vector for the service function chain by applying a featurization function on the filtered data, the topology, and the hierarchical structure of the service function chain such that metrics for each hierarchical level are based on metrics of a lower hierarchical level.

Embodiment A2. The apparatus of Embodiment A1, wherein the processing circuitry is configured to apply the featurization function on the filtered data, the topology, and the hierarchical structure of the service function chain by being configured to:
in a first hierarchical level of the plurality of hierarchical levels, calculate first level metrics based on the filtered data;
in a second hierarchical level of the plurality of hierarchical levels, calculate second level metrics based on the calculated first level metrics;
in a third hierarchical level of the plurality of hierarchical levels, calculate third level metrics based on the calculated second level metrics;
use the calculated first, second and third level metrics to compute a first level feature vector;
use the first level feature vector and the calculated second and third level metrics to compute a second level feature vector; and
use the second level feature vector and the third level metrics to compute a third level feature vector.

Embodiment A3. The apparatus of any one of Embodiments A1 and A2, wherein the processing circuitry is further configured to use the computed harmony feature vector to profile a normal behavior of the service function chain.

Embodiment A4. The apparatus of any one of Embodiments A1-A3, wherein the processing circuitry is further configured to use the computed harmony feature vector to detect malware in the service function chain.

Embodiment A5. The apparatus of any one of Embodiments A1-A4, wherein the data includes logs collected in a predetermined time period.

Embodiment A6. The apparatus of any one of Embodiments A1-A5, wherein the hierarchical levels comprise at least a micro-service level, a service function level and a service function chain level.

Embodiment A7. The apparatus of any one of Embodiments A1-A6, wherein the processing circuitry is configured to apply the featurization function on the filtered data, the topology, and the hierarchical structure of the service function chain by being configured to:
apply the featurization function on a model representing virtual interactions between the virtual components and the hierarchical levels, the model generated based on the filtered data, the topology, and the hierarchical structure of the service function chain.

Embodiment A8. The apparatus of Embodiment A7, wherein the processing circuitry is further configured to:

generate the model based on virtual system calls between the virtual components, the received data including logs of the virtual system calls.

Embodiment A9. The apparatus of any one of Embodiments A1-A8, wherein the processing circuitry is further configured to:
calculate features in a lower hierarchical level based on metrics from at least one higher hierarchical level.

Embodiment A10. The apparatus of any one of Embodiments A1-A9, wherein the processing circuitry is further configured to:
calculate features in a medium hierarchical level and/or a higher hierarchical level based on metrics from higher hierarchical levels and features from lower hierarchical levels.

A11. The apparatus of any one of Embodiments A1-A10, wherein the processing circuitry is further configured to:
calculate an objective feature based on an objective of the service function chain.

A12. The apparatus of any one of Embodiments A1-A11, wherein the processing circuitry is further configured to:
determine a feature sequence for the service function chain.

Embodiment B1. A method for malware detection in a service function chain, the method comprising:
receiving data associated with a service function chain, the service function chain comprising a plurality of virtual components organized into a plurality of hierarchical levels;
filtering the received data for the plurality of virtual components of the service function chain based at least in part on which hierarchical level the virtual component belongs to;
receiving information indicating a topology and a hierarchical structure of the service function chain; and
computing a harmony feature vector for the service function chain by applying a featurization function on the filtered data, the topology, and the hierarchical structure of the service function chain such that metrics for each hierarchical level are based on metrics of a lower hierarchical level.

Embodiment B2. The method of Embodiment B1, wherein the applying the featurization function on the filtered data, the topology, and the hierarchical structure of the service function chain comprises:
in a first hierarchical level of the plurality of hierarchical levels, calculating first level metrics based on the filtered data;
in a second hierarchical level of the plurality of hierarchical levels, calculating second level metrics based on the calculated first level metrics;
in a third hierarchical level of the plurality of hierarchical levels, calculating third level metrics based on the calculated second level metrics;
using the calculated first, second and third level metrics to compute a first level feature vector;
using the first level feature vector and the calculated second and third level metrics to compute a second level feature vector; and
using the second level feature vector and the third level metrics to compute a third level feature vector.

Embodiment B3. The method of any one of Embodiments B1 and B2, further comprising using the computed harmony feature vector to profile a normal behavior of the service function chain.

Embodiment B4. The method of any one of Embodiments B1-B3, further comprising using the computed harmony feature vector to detect malware in the service function chain.

Embodiment B5. The method of any one of Embodiments B1-B4, wherein the data includes logs collected in a predetermined time period.

Embodiment B6. The method of any one of Embodiments B1-B5, wherein the hierarchical levels comprise at least a micro-service level, a service function level and a service function chain level.

Embodiment B7. The method of any one of Embodiments B1-B6, wherein the applying the featurization function on the filtered data, the topology, and the hierarchical structure of the service function chain comprises:
applying the featurization function on a model representing virtual interactions between the virtual components and the hierarchical levels, the model generated based on the filtered data, the topology, and the hierarchical structure of the service function chain.

Embodiment B8. The method of Embodiment B7, further comprising:
generating the model based on virtual system calls between the virtual components, the received data including logs of the virtual system calls.

Embodiment B9. The method of any one of Embodiments B1-B8, further comprising:
calculating features in a lower hierarchical level based on metrics from at least one higher hierarchical level.

Embodiment B10. The method of any one of Embodiments B1-B9, further comprising:
calculating features in a medium hierarchical level and/or a higher hierarchical level based on metrics from higher hierarchical levels and features from lower hierarchical levels.

Embodiment B11. The method of any one of Embodiments B1-B10, further comprising:
calculating an objective feature based on an objective of the service function chain.

Embodiment B12. The method of any one of Embodiments B1-B11, further comprising:
determining a feature sequence for the service function chain.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer to perform one or more of the processes described herein. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. An apparatus for malware detection in a service function chain, the apparatus comprising processing circuitry configured to:
   receive data associated with a service function chain, the service function chain comprising a plurality of virtual components organized into a plurality of hierarchical levels and the data indicating interactions between the virtual components when processing at least one packet through the service function chain;
   filter the received data based at least in part on a time-order relation of the interactions between the virtual components and the hierarchical level of the virtual component; and
   generate a harmony feature vector for the service function chain by applying a featurization function on the filtered data, the harmony feature vector including metrics, the metrics calculated according to the featurization function for each hierarchical level being based at least in part on metrics calculated for at least one lower hierarchical level.

2. The apparatus of claim 1, wherein the received data includes virtual system calls between the virtual components.

3. The apparatus of claim 1, wherein the received data includes virtual system calls comprised in logs collected from the plurality of virtual components.

4. The apparatus of claim 1, wherein the plurality of hierarchical levels includes a service function level and a service function chain level, the service function chain level being at a higher hierarchical level than the service function level.

5. The apparatus of claim 1, wherein the time-order relation of the interactions between the virtual components represents a time-order relation of a set of operations performed on the at least one packet in a sequential manner from a first service function in the service function chain to a last service function in the service function chain.

6. The apparatus of claim 1, wherein the processing circuitry is configured to apply the featurization function on the filtered data by being configured to:
   for a first hierarchical level of the plurality of hierarchical levels, calculate first level metrics based on the filtered data;
   for a second hierarchical level of the plurality of hierarchical levels, calculate second level metrics based on the calculated first level metrics;
   use at least the calculated first and second level metrics to compute a first level feature vector; and
   use at least the calculated first level feature vector and the calculated second level metrics to compute a second level feature vector.

7. The apparatus of claim 1, wherein the processing circuitry is further configured to use the generated harmony feature vector to profile a normal behavior of the service function chain.

8. The apparatus of claim 1, wherein the processing circuitry is further configured to use the generated harmony feature vector to detect malware in the service function chain.

9. The apparatus of claim 1, wherein the processing circuitry is further configured to calculate an objective feature based on an objective of the service function chain.

10. The apparatus of claim 1, wherein the processing circuitry is further configured to cause the apparatus to:
receive information indicating a topology and a hierarchical structure of the service function chain.

11. A method for malware detection in a service function chain, the method comprising:
receiving data associated with a service function chain, the service function chain comprising a plurality of virtual components organized into a plurality of hierarchical levels and the data indicating interactions between the virtual components when processing at least one packet through the service function chain;
filtering the received data based at least in part on a time-order relation of the interactions between the virtual components and the hierarchical level of the virtual component; and
generating a harmony feature vector for the service function chain by applying a featurization function on the filtered data, the harmony feature vector including metrics, the metrics calculated according to the featurization function for each hierarchical level being based at least in part on metrics calculated for at least one lower hierarchical level.

12. The method of claim 11, wherein the received data includes virtual system calls between the virtual components.

13. The method of claim 11, wherein the received data includes virtual system calls comprised in logs collected from the plurality of virtual components.

14. The method of claim 11, wherein the plurality of hierarchical levels includes a service function level and a service function chain level, the service function chain level being at a higher hierarchical level than the service function level.

15. The method of claim 11, wherein the time-order relation of the interactions between the virtual components represents a time-order relation of a set of operations performed on the at least one packet in a sequential manner from a first service function in the service function chain to a last service function in the service function chain.

16. The method of claim 11, wherein the applying the featurization function on the filtered data further comprises:
for a first hierarchical level of the plurality of hierarchical levels, calculating first level metrics based on the filtered data;
for a second hierarchical level of the plurality of hierarchical levels, calculating second level metrics based on the calculated first level metrics;
using at least the calculated first and second level metrics to compute a first level feature vector; and
using at least the calculated first level feature vector and the calculated second level metrics to compute a second level feature vector.

17. The method of claim 11, further comprising:
using the generated harmony feature vector to profile a normal behavior of the service function chain.

18. The method of claim 11, further comprising:
using the generated harmony feature vector to detect malware in the service function chain.

19. The method of claim 11, further comprising:
calculating an objective feature based on an objective of the service function chain.

20. The method of claim 11, further comprising:
receiving information indicating a topology and a hierarchical structure of the service function chain.

21. A computer readable non-transitory medium having computer program code embodied therein, the computer program code being configured such that, on execution, the computer program code causes an apparatus to perform a method, the method comprising:
receiving data associated with a service function chain, the service function chain comprising a plurality of virtual components organized into a plurality of hierarchical levels and the data indicating interactions between the virtual components when processing at least one packet through the service function chain;
filtering the received data based at least in part on a time-order relation of the interactions between the virtual components and the hierarchical level of the virtual component; and
generating a harmony feature vector for the service function chain by applying a featurization function on the filtered data, the harmony feature vector including metrics, the metrics calculated according to the featurization function for each hierarchical level being based at least in part on metrics calculated for at least one lower hierarchical level.

\* \* \* \* \*